United States Defensive Publication [19] (H) [11] T962,007

Caunt et al. [43] Sept. 6, 1977

[54] TREATMENT OF TRANSITION METAL COMPOUND

[75] Inventors: Anthony David Caunt; Alan Branford Newton, both of Welwyn Garden City; Ian Gabriel Williams, Letchworth; Michael Stanley Fortuin, Chester, all of England

[73] Assignee: Imperial Chemical Industries Limited, London, England

[21] Appl. No.: 733,408

[22] Filed: Oct. 18, 1976

[30] Foreign Application Priority Data

| | | |
|---|---|---|
| Oct. 29, 1975 | United Kingdom | 44633/75 |
| Apr. 29, 1976 | United Kingdom | 17490/76 |
| Apr. 29, 1976 | United Kingdom | 17491/76 |

[51] Int. Cl.[2] ..... C08F 4/64

[52] U.S. Cl. ..... 252/429 B; 526/137; 526/139

[57] ABSTRACT

According to the present invention (1) a titanium trihalide is ground in the presence of from 5 up to 75% molar, relative to the titanium trihalide, of (2) a Lewis Base compound which is an organo-phosphorus compound of the formula $$R_1R_2R_3P(O)_a$$

and either (a) from 1 up to 50% molar, relative to the titanium trihalide, of a titanium tetrahalide and/or (b) from 0.2 up to 50% molar, relative to the titanium trihalide, of an oxidizing agent, wherein when a titanium tetrahalide is present, the molar quantity of the organo-phosphorus compound is at least equal to the molar quantity of the titanium tetrahalide.

The titanium halides (1) and (a) are preferably the chlorides. Suitable forms of titanium trichloride are obtained by the reduction of titanium tetrachloride with hydrogen, titanium metal, aluminum metal or an organo-aluminium compound. It is preferred to use a material of the type, titanium trichloride/aluminium chloride, such as is obtainable by the reduction of titanium tetrachloride with aluminium metal.

In the organo-phosphorus compound, $R_1$ is conveniently an alkyl group containing 2 to 10 carbon atoms. The groups $R_2$ and $R_3$ can be alkyl, aryl, cycloalkyl, alkaryl or aralkyl groups. Preferably, $R_2$ and $R_3$ are both alkyl groups and preferably $R_1$, $R_2$ and $R_3$ are all the same, for example, butyl as in tributylphosphine and tributylphosphine oxide.

Suitable oxidizing agents include oxygen gas or halogen-containing materials such as chlorine gas, carbon tetrachloride, hexachlorocyclopentadiene, stannic chloride, phosphorus pentachloride and iodine.

The product produced by grinding (1), (2) and either (a) and/or (b) above may be admixed with (A) to form an olefin polymerization catalyst, wherein (A) is at least one organo-metallic compound of aluminium or of a non-transition metal of Group IIA of the Periodic System, or a complex of an organo-metallic compound of a non-transition metal of Group IA or IIA of the Periodic System and an organo-aluminium compound. That polymerization catalyst may be modified by the addition of a Lewis Base which is effective to modify the stereospecificity of the catalyst and/or a substituted or unsubstituted polyene.

10 Claims, No Sheets Drawing,

20 Pages Specification

The file of this unexamined application may be inspected and copies thereof may be purchased (849 O.G. 1221, Apr. 9, 1968).